United States Patent [19] [11] 4,402,773
Morrill [45] * Sep. 6, 1983

[54] REMOTE AUTOMATIC MAKE-UP STAB-IN SEALING SYSTEM

[75] Inventor: Charles D. Morrill, Bellaire, Tex.

[73] Assignee: Smith International, Inc., Newport Beach, Calif.

[*] Notice: The portion of the term of this patent subsequent to Nov. 1, 1994, has been disclaimed.

[21] Appl. No.: 958,314

[22] Filed: Nov. 6, 1978

Related U.S. Application Data

[62] Division of Ser. No. 833,553, Sep. 15, 1977.

[51] Int. Cl.³ .............................................. F16L 35/00
[52] U.S. Cl. ................................. 285/25; 285/137 A; 285/140; 285/340; 285/347; 285/348
[58] Field of Search .......... 285/DIG. 3, 25, DIG. 18, 285/348, 162, 196, 338, 340, 144, 145, 146, 147, 148, 137 A, 140, 347; 277/1, 9, 117, 118, 119, 190, 180, 188, 235 A, 235 R, 236; 138/109, 190; 166/75 A, 217

[56] References Cited

U.S. PATENT DOCUMENTS

| 1,721,325 | 7/1929 | Wilson | 277/236 X |
| 2,574,109 | 11/1951 | Kune et al. | 285/238 X |
| 2,757,945 | 8/1956 | Bingham | 285/340 |
| 3,038,456 | 6/1962 | Dreisin | 277/236 X |
| 3,051,200 | 8/1962 | Bevington | 138/89 |
| 3,834,666 | 9/1974 | Keith | 285/DIG. 18 |
| 3,915,462 | 10/1975 | Bruns | 277/190 |

FOREIGN PATENT DOCUMENTS

| 84078 | 10/1964 | France | 285/340 |
| 323305 | 12/1934 | Italy | 285/340 |
| 367429 | 2/1932 | United Kingdom . | |
| 514661 | 11/1939 | United Kingdom . | |
| 538517 | 8/1941 | United Kingdom . | |
| 805350 | 12/1958 | United Kingdom . | |
| 917726 | 2/1963 | United Kingdom . | |
| 1018227 | 1/1966 | United Kingdom | 285/340 |
| 1299819 | 12/1972 | United Kingdom . | |

Primary Examiner—Dave W. Arola
Attorney, Agent, or Firm—Murray Robinson; Ned L. Conley; David Alan Rose

[57] ABSTRACT

A remote, automatic make-up, stab-in sealing system for providing metal-to-metal seals between a projecting structure and a surrounding bore telescopically receiving the projecting structure is disclosed. The sealing system includes the projecting structure, such as a pipe hanger or pack-off nipple. The sealing system further includes apparatus having the bore for receiving the projecting structure, such as a wellhead or tubing hanger. The sealing system also includes a seal assembly. The seal assembly includes at least one frusto-conical shaped metal gasket, a split ring and an actuator ring. The rings force the frusto-conical shape metal gasket into metal-to-metal sealing engagement with the walls of both the projecting structure and the bore as the projecting structure is telescopically received by the bore.

7 Claims, 3 Drawing Figures

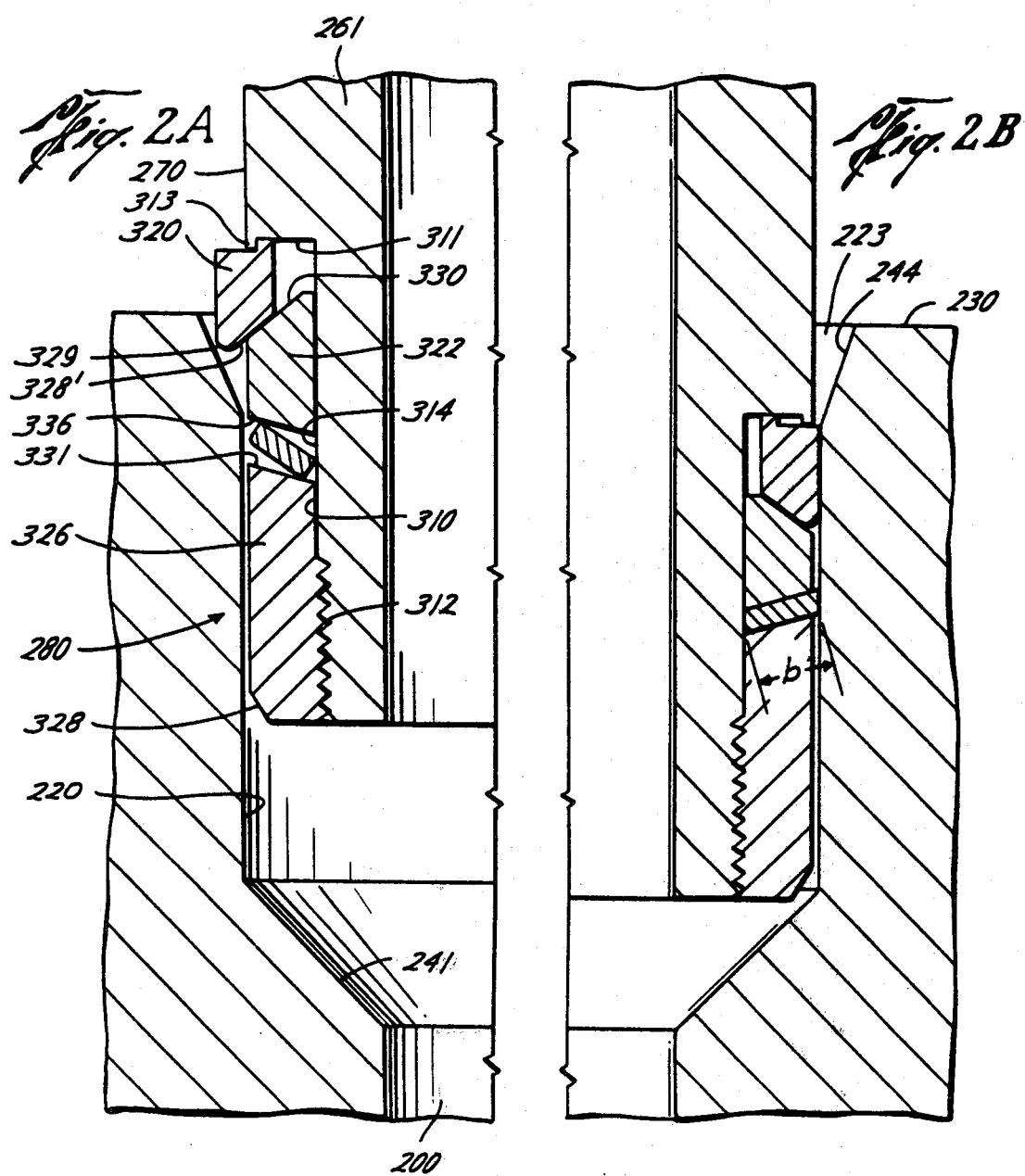
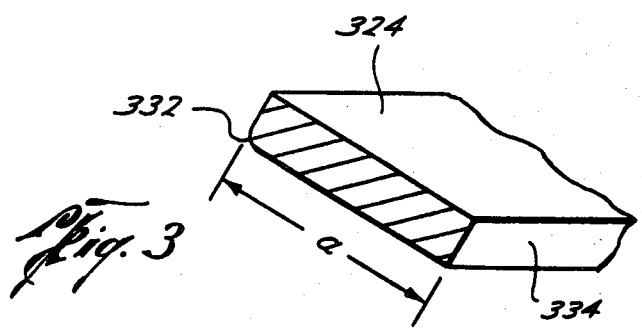

REMOTE AUTOMATIC MAKE-UP STAB-IN SEALING SYSTEM

This is a division of Ser. No. 833,553, filed Sept. 15, 1977.

REFERENCE TO RELATED APPLICATIONS

The remote sealing system is of the metal-to-metal sealing type and is related to the seals for hangers disclosed in my copending U.S. patent application, Ser. No. 611,860, filed Sept. 10, 1975, and my copending U.S. patent application, Ser. No. 785,435, filed Apr. 7, 1977, both entitled "Seal" and is related to the seals for stems disclosed in my copending U.S. patent application, Ser. No. 697,084, filed June 16, 1976, entitled "Extreme Temperature, High Pressure, Balance Rising Stem Gate Valve with Super Preloaded, Stacked, Solid Lubricated, Metal-To-Metal Stem Seals".

The foregoing applications are assigned to the owner of the present application and their disclosures are incorporated herein by reference, including the references to the state of the art.

Applicant claims the priority of his United States of America application Ser. No. 833,553, filed Sept. 15, 1977, entitled "REMOTE AUTOMATIC MAKE-UP STAB-IN SEALING SYSTEM" of which this application is a divisional application and of his aforementioned pending United States of America Application, Ser. No. 697,084, filed June 16, 1976, and his prior United States of America Application, Ser. No. 611,860, filed Sept. 10, 1975, now U.S. Pat. No. 4,056,272, issued Nov. 1, 1977, of which Ser. No. 697,084 is a continuation-in-part, and his prior United States of America Application, Ser. No. 785,435, filed Apr. 7, 1977, now U.S. Pat. No. 4,109,942, issued Aug. 29, 1978, which is a division of Ser. No. 611,860, and prior United States of America Application, Ser. No. 447,141, filed Mar. 1, 1974, and now abandoned, of which Ser. No. 611,860, now U.S. Pat. No. 4,056,272, is a continuation in part.

BACKGROUND OF THE INVENTION

1. Field of the Invention

This invention relates to telescopically engaging oil field bore hole containing apparatus and insertion apparatus with sealing means between them.

2. Description of the Prior Art

Various means have heretofore been used to seal around pipe hangers in a wellhead as, for example, the O-rings and packing elements of elastomeric material as shown in U.S. Pat. No. 2,830,665 Burns et al.

Recently, however, oil wells having bottom hole pressures of as high as 30,000 pounds per square inch have been encountered, and such seals as have previously been used have not been capable of holding such pressures. Additionally, underwater well completions require reliable seals of the metal-to-metal type instead of the elastomeric type which break down from subjection to chemicals, heat, or water for sustained periods of time.

Metal-to-metal seals of various kinds have also been used in many installations, including in wellheads. For example, the aforesaid patent to Burns et al shows the use of a metal ring gasket between two flanges of the christmas tree construction shown there.

One form of metal-to-metal gasket which has heretofore been known is that shown in U.S. Pat. No. 2,992,840 to Reynolds et al, which discloses a metal gasket which is frusto-conical in cross section and which is compressed between two flanges having a greater cone angle so that the gasket is deformed, the edges of the gasket being "coined" so as to closely engage elements of the flanges and provide a metal-to-metal seal.

Gaskets which apparently function similarly to those shown in the Reynolds et al. patent are manufactured and sold by Aeroquip Corporation of Los Angeles, California under the trademarks CONOMASTER and CONOSEAL.

None of the aforesaid sealing systems has been capable of dependably providing a seal under pressures as high as 20,000 psi, much less 30,000 psi or higher. Furthermore, sealing systems such as that shown in the Reynolds et al. patent are objectionable because the gaskets may work-harden and cause damage to moving sealing surfaces. They also do not dependably seal against pressures from either direction, as required in pipe suspension apparatus. Additionally, they are objectionable because of difficulty in installing such a gasket in a well pipe suspension apparatus, where the gasket must be installed in an inaccessible location.

Remote sealing, stab-in devices for automatic telescopic sealing engagement with bore holes are also known in the art. These devices normally provide for vertical insertion and are ot two types. The first type employs remote connectors that pull the devices into the bore holes, or otherwise pull or push the devices and the apparatus having the bore hole together to activate the seal. The second type employs the weight of the device inserted into the bore hole to effect the seal. These techniques of sealing, however, require close vertical tolerance to insure, for example, the formation of metal-to-metal seals between pack-off nipples and tubing hangers as the pack-off nipples are inserted into the tubing hanger. The close tolerance of the vertical spacing, for example, between the top of the tubing hanger and the top of the wellhead, is very difficult to control because, for example, the wellhead rests on an outer casing hanger of a series of casing hangers which rest on one another, while the tubing hanger rests on the inner casing hanger of the series of casing hangers. Any mud or other contamination between the casing hangers at the point of support will therefore change the vertical spacing between the tubing hanger and the top of the wellhead. Unlike the present invention, none of the aforesaid sealing systems is substantially free of the requirement for close vertical tolerance.

SUMMARY OF THE INVENTION

The present invention provides an automatic, remote make-up, stab-in sealing system in conjunction with projecting structures and surrounding bore holes telescopically receiving the structures. The sealing system utilizes a metal-to-metal seal and is capable of being used at an inaccessible location, such as in a wellhead or tubing hanger. The sealing system will dependably provide a seal against pressures of 30,000 psi or higher, applied to either the top or the bottom of the sealing system. Furthermore, the preferred embodiment of the sealing system of this invention is capable of forming a plurality of automatic, remote make-up, metal-to-metal seals as a series of projecting structures are simultaneously stabbed into surrounding boreholes.

According to the preferred embodiment of this invention, sealing against pressures on either side of the seal is provided, as between a pack-off nipple and a tubing hanger adapter for adapting a tubing string in a tubing hanger to a christmas tree, for example, by means of an annular frusto-conical shaped metal gasket. This gasket fits between the inner surface of pockets in the tubing hanger bore and the outer surface of the pack-off nipple, so that the edges of the inner and outer periphery of the gasket sealingly engage these surfaces. The sealing system includes a series of seal assemblies typically located on, for example, the pack-off nipples. Each assembly includes a frusto-conical shaped metal gasket and a split ring juxtaposed with an actuator ring. Upon insertion of the pack-off nipples into the bores, the contraction of the split rings will force movement of the actuator rings against the metal gaskets. This movement applies sufficient force to the metal gaskets to cause the edges of each of the gaskets to coin, forming metal-to-metal seals between the edges of the gaskets and the respective inner and outer surfaces of the pockets and pack-off nipples. These seals are made at sufficient pressure to prevent well fluids from flowing around the gaskets in either direction. In the preferred embodiment, the sealing assemblies may be vertically offset from one another to permit the setting of the metal-to-metal seals one at a time in order to lower the force necessary to insert the christmas tree with the pack-off nipples attached into the bores of the tubing hanger.

BRIEF DESCRIPTION OF THE DRAWING

For a further understanding of the nature and objects of the present invention, reference should be had to the following detailed description, taken in conjunction with the accompanying drawings in which like parts are given like reference numerals and wherein:

FIG. 2 is an enlarged fragmentary view showing a sealing assembly of the preferred embodiment of the apparatus in FIG. 1, the half drawing on the left (FIG. 2A) depicting the sealing assembly in the unloaded condition, and the half drawing on the right (FIG. 2B) showing the sealing assembly as it appears when loaded after insertion into a pocket in the tubing hanger; and FIG. 3 is a cross sectional view of a metal gasket ring of the sealing assembly before compression of the gasket.

DESCRIPTION OF THE PREFERRED EMBODIMENT

Figure 1:
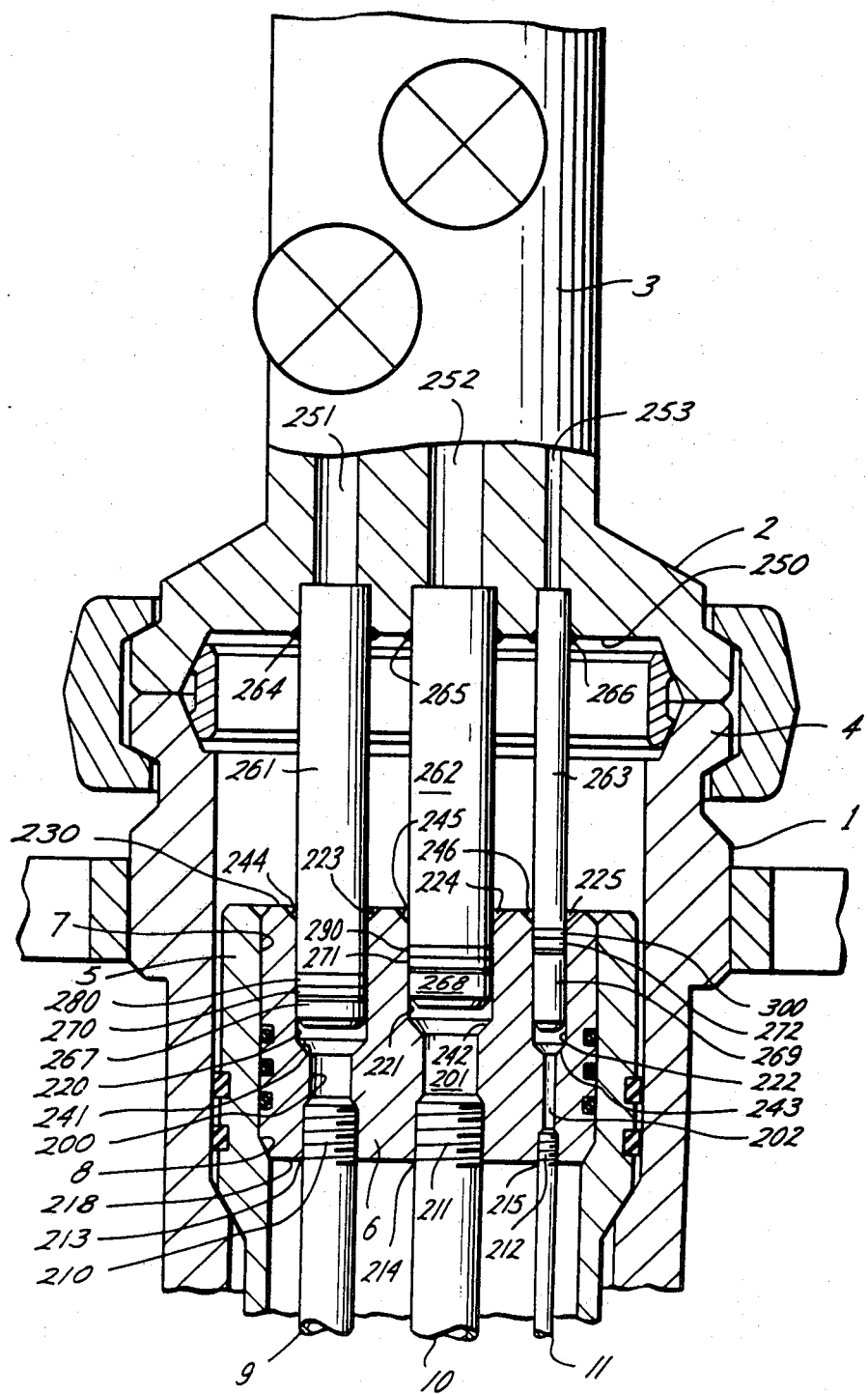
FIG. 1 is a vertical sectional view of a portion of a wellhead with a tubing hanger for multiple tubings and hydraulic control lines and a portion of a christmas tree with multiple pack-off nipples and sealing assemblies attached to the pack-off nipples, the sealing assemblies vertically staggered with respect to the bottom of the christmas tree, according to the preferred embodiment of this invention.

A wellhead 1 and lower flange 2 of a christmas tree 3 supported on a shoulder 4 of the wellhead 1 are shown in FIG. 1. Wellhead 1 is supported by a conventional casing hanger (not shown) which also supports at least one, and usually a series of, juxtaposed inner casing hangers suspended within the bore of the wellhead. The innermost casing hanger 5 of the casing hangers supports a tubing hanger system 6. See, for example U.S. Pat. No. 3,741,294 to Morrill, issued on June 26, 1973 and U.S. Pat. No. 3,540,533 to Morrill, issued Nov. 17, 1970. Tubing hanger system 6 is supported within the bore 7 of the innermost casing hanger 5 on a shoulder 8 thereof. For examples of details of support of the tubing hanger 6 by shoulder 8 and the packing between the tubing hanger 6 and the juxtaposed outer casing hanger 5, see U.S. Pat. Nos. 3,741,294 and 3,540,533. The tubing hanger 6 supports a set of tubing strings 9, 10 and hydraulic line 11 as is well known in the art. The hydraulic line 11 may, for example, be a hydraulic control line controlling the position of a valve (now shown) in tubing strings 9, 10 which are positioned in bore 7 below the tubing hanger 6.

Bores or pockets 200, 201, 202 are formed in tubing hanger 6 by drilling or other means known in the art. Pockets 200, 201, 202 include first threaded bores 210, 211, 212 respectively which are co-axial with tubing strings 9, 10 and hydraulic line 11 respectively and have openings at 213, 214, 215 respectively on the lower surface 218 of tubing hanger 6. Tubing strings 9, 10 and hydraulic line 11 are attached to threaded bores 210, 211, 212 respectively by the threads in bores 210, 221, 212. Bores 200, 201, 202 further including substantially smooth counterbores 220, 221, 222 respectively having openings 223, 224, 225 respectively on the upper surface 230 of tubing hanger 6. Smooth counterbores 220, 221, 222 are co-axial with and larger in diameter than threaded bores 210, 211, 212 respectively, forming annular shoulders 241, 242, 243 respectively between them. The mouths of openings 223, 224, 225 include upward facing, inwardly tapered annular surfaces 244, 245, 246 respectively.

Upper surface 230 of tubing hanger 6 is opposite to and spaced apart from the lower surface 250 of christmas tree 3. Christmas tree 3 includes bores or pockets 251, 252, 253 formed therein by drilling or other suitable means. Bores 251, 252, 253 have openings in the lower surface 250 of christmas tree 3. Bores 251, 252, 253 extend upwardly through christmas tree 3 to valves and hydraulic connections (not shown).

Pack-off nipples 261, 262, 263 are attached to and coaxial with bores 251, 252, 253 respectively by welds 264, 265, 266 or other suitable attachment mechanism. Pack-off nipples 261, 262, 263 depend from the lower surface 250 of tubing hanger 3. Pack-off nipples 261, 262, 263 are of different lengths so that ends 267, 268, 269 of pack-off nipples 261, 262, 263 are in substantially parallel planes which are vertically spaced apart.

Pack-off nipples 261, 262, 263 are telescopically received in smooth counter bores 220, 221, 222 respectively, the outer surfaces 270, 271, 272 of pack-off nipples 261, 262, 263 being substantially parallel to the inner walls of counter bores 220, 221, 222. Sealing assemblies 280, 290, 300 are located on the outer surfaces 270, 271, 272 respectively of pack-off nipples 261, 262, 263 at different vertical distances from lower surface 250 of christmas tree 3. Sealing assemblies 280, 290, 300 form metal-to-metal seals with both the outer surfaces 270, 271, and 272 respectively of pack-off nipples 261, 262, 263 and the inner surfaces of bores 220, 221, 222 respectively.

Sealing assemblies 280, 290, 300 are alike, so only one sealing assembly 280 need be described in further detail. FIG. 2A shows sealing assembly 280 in position when there is no load on the sealing assembly, and FIG. 2B shows the sealing assembly when the sealing assembly is fully loaded.

Pack-off nipple 261 (FIG. 2) includes a bore 223 through it which provides fluid communication between bore 200 and bore 251. Pack-off nipple 261 further includes a narrow diameter portion 310 at the end closest to the bottom of bore 200, forming shoulder 311 between narrow portion 310 and the rest of the pack-off nipple 261. Shoulder 311 includes an exterior, vertically downwardly extending, narrow annular ring 313 surrounding the rest of shoulder 311 which is vertically raised with respect to exterior ring 313. The lowest part 312 of portion 310 is threaded on its exterior, with the upper part 314 of the external portion 310 being substantially smooth.

Seal assembly 280 is disposed on the exterior 270 of pack-off nipple 261 along the narrow diameter portion 310. Seal assembly 280 includes split ring 320, actuator ring 322, frustoconical metal gasket 324, and retainer nut 326.

The lower portion of retainer nut 326 is internally threaded with threads of the same pitch as the outer threads of lowest part 312. Retainer nut 326 is connected by its threads to the threads of lowest part 312. The retainer nut 326 also has an outer tapered circumferential surface 328 corresponding to the taper of the shoulder 241 in the tubing hanger 6. The upper surface 331 of the retainer nut 326 is frusto-conical at an angle which may, for example, be about 15° to the horizontal, but which may also, in many installations, be substantially less or substantially more than this, i.e., from about 0° to about 45°.

Resting upon the retainer nut 326 is metal gasket 324 which surrounds the substantially smooth cylindrical portion 314.

The gasket 324 is frusto-conical in cross section, having a width substantially greater than its thickness. The lower outer corner of the gasket 324 is rounded at 332, so as to eliminate the sharp corner. The radius of curvature of the rounded corner 332 of gasket 324 is in the range, for example of 0.02 inches to 0.04 inches. The other corners are preferably "broken". The cone of the metal gasket 324 is in the same direction as the cone of the upper surface 331 of the retainer nut 326, but has a smaller included cone angle. The differences in the cone angles may be from 10° to 40° or more, depending upon the particular materials and proportions of the elements. In one design, which has been found to work satisfactorily, the gasket is about ½ inch wide and about 0.1 inch thick, the upper frusto-conical surface 326 of the retainer nut is at approximately 15° to the horizontal (cone angle 150°) and the gasket 324 surfaces are at about 30° to the horizontal (cone angle 120°). The upper edge of the inner periphery of the gasket 324 bears against the lower frusto-conical surface 336 of the actuator ring 332 which has a close sliding fit around the cylindrical upper part 314 of the pack-off nipple 261.

Actuator ring 322 is a solid ring. The lower surface 336 of actuator ring 322 is frusto-conical in shape and has the same characteristics as upper surface 331. The upper surface 330 of actuator ring 322 is beveled at an angle of, for example, slightly greater than 0° to 45°. The upper surface 330 of the make-up ring 332 is also frusto-conical, the direction of the bevel of upper surface 330 is opposite that of the surface 336. Surface 330 bears against the corresponding surface 328' of the split ring 320.

Ring 320 is of the split ring type, having a gap slightly greater than the change in circumference of ring 320 as ring 320 is compressed into the bore 220, for example, 0.8 inches for a diameter of 3.6 inches. The lower surface 328' of actuator ring 320 is beveled at the same angle as the angle of upper surface 330. The length of surfaces 328', 330 should be sufficient to cause compression of the gasket 324 as discussed infra between the surfaces 331, 336. The outer circumference of the retainer nut 326, actuator ring 332 and pack-off nipple 261 fit comparatively loose within the upper portion of the bore 220 of the tubing hanger 6. Ring 320 further includes rounded shoulder 329 at the lowest end of surface 328', at which is the outer end of the ring 320.

Assembly of the sealing assembly is accomplished by first sliding the split ring 320 onto narrow portion 310 until it is located adjacent to shoulder 311 in the interior of annular ring 313. Actuator ring 322 and metal gasket 324 are then slid onto narrow portion 310. Retainer nut 326 is finally screwed onto threaded lower part 312 of pack-off nipple 261. The affixing of retainer nut 326 on lower part 312 will cause the upper surface 330 of actuator ring 322 to come into contact with the lower surface 328' of split ring 320 along a length of the surface 328'.

The rings 320, 322 and the gasket 324 will be carried on the retainer nut 326 without actuation of the sealing assembly 280 as the assembly goes into the bore 220 until the lowest shoulder 329 of split ring 320 engages the annular shoulder 244 of the tubing hanger 6. The weight of the christmas tree 3, for example, 20,000–30,000 pounds, will then cause contraction of split ring 320 as it is forced down the slanting surface of annular shoulder 244 and into the bore 220. As split ring 320 contracts, lower surface 328' of split ring 320 will ride up the upper surface 330 of actuator ring 322 forcing actuator ring 322 to move downwardly, bearing on metal gasket 324. As actuator ring 322 moves downwardly, the force exerted by the lower surface 336 of actuator ring 322 on metal gasket 324 will begin to deform the gasket 324 causing it to assume the position shown in FIG. 2B. As in the gasket design disclosed in the Reynolds et al patent, the retainer nut 326 and the actuator ring 322 engage opposed faces of the gasket 324 to prevent it from buckling during deformation.

The deformation of gasket 324 causes a decrease in the inside diameter of the gasket 324 and an increase in the outside diameter of the gasket 324. The annular width of the gasket 324 is such that when it is compressed between the surfaces 326 and 331, as shown in FIG. 2B, the outer circumference moves radially outwardly and the inner circumference moves radially inwardly and pivots on the wall of upper end 314 until the rounded corner 332 and corner 334 are deformed or "coined" to form a metal-to-metal seal with both the bore 220 of the tubing hanger 6 and the cylindrical smooth upper end 314 of lower portion 310 of the pack-off nipple 261, so that sealing is effected on both sides of the gasket 324. The annular width a of the gasket 324 should, therefore, be greater than the width of the upper surface 331 of the retainer nut 326, and to be sure that a good seal is obtained, the gasket 324 should be wide enough for at least about one-half of the thickness of the edge to interfere with both the tubing hanger bore 220 and the smooth upper end 314. Preferably, the gasket 324 substantially entirely fills the space between the retainer nut 326 and the actuator ring 322, and to accomplish this the annular width a of the gasket 324 may be as wide as the annular space between bore 220 and the surface of upper part 314 as shown at b.

It is apparent that in order for such metal-to-metal seal to occur, the gasket 324 is made of a material which is softer than the materials of the pack-off nipple and the tubing hanger, so that the inner and outer edges are deformed or "coined" to conform to the surfaces engaged by the gasket 324 and do not gall the surfaces. Thus, the gasket 324 conforms to small irregularities in these surfaces, insuring a sealing fit. The preferable angles with respect to the horizontal, as well as the total lengths of lower surfaces 328 of split ring 320 and upper surface 330 of actuator ring 322, should be such that when split ring 320 is fully within the portion of bore 220 below annular shoulder 244, gasket 324 forms the metal-to-metal seals with the bore 220 and surface of upper part 314 under sufficient pressure to seal against at least the maximum expected pressure exerted by the well fluids against the seals.

The undeformed inner and outer edges of the gasket 324 are preferably substantially perpendicular to the top 336 and bottom 331 surfaces in order that coining of the edges will result in the gasket 324 substantially filling the space between the retainer nut 326 and the actuator ring 322.

Because the gasket 324 has an outside diameter which is substantially smaller than the bore 220 of the tubing hanger, there is no chance that the surface of the gasket 324 can be damaged by scraping on the bore 220 of the tubing hanger until actuated, the first contact of the gasket 324 with the bore 220 being when the seal is actuated. Although, as discussed infra, the seal assembly may be required to travel downward after actuation for a short distance to permit actuation of the other seal assemblies, the final position of the seal is at substantially the point at which the actuation of the seal is to be accomplished. This substantially eliminates the possibility of damage to the gasket 324 prior to contact of flange 2 with surface 4 at which point all movement of seal assembly 280 will stop.

The gasket 324 is substantially rigid, being formed of a material such as copper, copper alloys, aluminum, stainless steel or steel, which is softer than the material of the surfaces against which it seals. Sometimes the gasket 324 is made from the same material as the materials of the surfaces against which it seals but annealed to make it softer, so that it will not damage the other surfaces.

Stainless steels have been found to have suitable characteristics for the gasket 324 of this invention. However, stainless steel tends to work-harden, so that it could become harder than the surfaces against which it seals and the metal-to-metal seal fitting of the gasket 324 between these surfaces could cause damage to the surfaces. This is avoided, according to a preferred embodiment of the present invention, by the aforesaid rounding off of the lower corner and breaking of the edges of the gasket and by "coining" into the surfaces.

It will be noted that the metal gasket 324 cones in FIG. 2 point toward the pressure being sealed against. For a nipple seal, this may be preferred, although when sealing between parallel surfaces the inner and outer peripheries of the seal are similarly engaged and hence reversible. The inner and outer peripheries of the ring gaskets 324 may be viewed as forming seals adapted respectively to seal against pressure directed against the convex or concave faces of the gasket 324.

In the preferred embodiment, one metal seal gasket 324 is preferred because it seals satisfactorily and requires less make-up load to set the seal.

The actuation of all seals assemblies 280, 290, 300 is accomplished by lowering christmas tree 3 toward tubing hanger 6 so that pack-off nipples 261, 262, 263 are telescopically received in bores 220, 221, 222. Further lowering of the christmas tree 3 will cause seal assembly 280 to actuate as defined supra. The actuation force necessary to cause actuation of seal assembly 280 may be, for the above example, in the range of 17,000 pounds. Because the weight of the christmas tree is in the range of 20,000 to 30,000 pounds or heavier, in the above example, the weight of the christmas tree will be sufficient to actuate seal assembly 280. After actuation, the actuated seal assembly 280 may be forced to slide down bore 220 by a force, for example, in the range of 8,500 pounds until the vertical position of christmas tree 3 with respect to tubing hanger 6 is reached which will cause actuation of seal assembly 290.

Seal assembly 290 is actuated in the same manner as described supra for seal assembly 280. The actuation force necessary to cause actuation of seal assembly 290 may be, for the above example, 17,500 pounds. The weight of the christmas tree will therefore also be sufficient to actuate seal assembly 290. After actuation, the actuated seal assemblies 280, 290 may be forced to slide down bores 220, 221 respectively by a force of 9,300 pounds until the vertical position of christmas tree 3 with respect to taubing hanger 6 is reached which will cause actuation of seal assembly 300.

Seal assembly 300 is actuated in the same manner as seal assemblies 280, 290. After all seal assemblies have been actuated, seal assemblies 280, 290, 300 may be forced to slide down bores 220, 221, 222 respectively until flange 2 comes to rest on wellhead shoulder 4 at which point seal gaskets 324 will come to rest in metal-to-metal sealing engagement with the nipples and bores.

After christmas tree flange 2 has come to rest upon wellhead surface 4, seal assemblies 280, 290, 300 may be tested by, for example, applying fluid pressure through openings 223, 224, 225. If any of the seals are leaking, the pressure will be detected through bores 251, 252, 253. If a leak is detected, the christmas tree 3 may be removed and the length of actuation ring 332 for the leaking seal assembly altered to reposition the point of metal-to-metal sealing engagement of the gasket 324 with the nipple and bore to avoid possible nicks or flaws.

Although the system described in detail supra has been found to be the most satisfactory and preferred, many variations in structure are possible. For example, the metal gaskets 324 may be of any suitable type. Also, the seal assemblies may be used between wellheads and pipe hangers or between casing heads and tubing hangers or between a seabed tubing hanger and a down hole tubing hanger. Additionally, plural, serially disposed pairs of split and actuating rings may be used if a longer vertical stoke is necessary to coin the edges of metal gaskets 324 under sufficient pressure to form the necessary metal-to-metal seals. Moreover, the retainer of the seal assembly may be a ring welded on the pack-off nipple, or the like. Additionally the split ring and actuator rings may be combined into one ring. Also, the relative positions of the nipples and bores may be reversed, e.g.: the nipples on the tubing hanger and the bores in the christmas tree. Moreover, the seal assemblies may include series of metal gaskets either separated or not separated by rings of elastomer. However, it should be noted that if a seal assembly employing multiple gaskets separated by rings of elastomer is used, much higher forces may be required to actuate the seals, such as, for example, 40,000 to 60,000 pounds for three metal rings and two rings of elastomer; and if a seal assembly employing multiple gaskets without separation by rings of elastomer is used, much higher forces may also be required to actuate the seals, such as, for example, 20,000 to 30,000 pounds for three metal rings.

The above are exemplary of the possible changes or variations.

Because many varying and different embodiments may be made within the scope of the inventive concept herein taught and because many modifications may be made in the embodiments herein detailed in accordance with the descriptive requirements of the law, it should be understood that the details herein are to be interpreted as illustrative and not in a limiting sense.

What is claimed as invention is:

1. A seal assembly disposed in a channel groove on the external periphery of a tubular member slidingly received within a bore of another member for providing a metal-to-metal seal between the tubular member and the internal wall of the bore, the channel groove having a bottom and two sides comprising
   a frustoconical shaped metal gasket disposed around the channel groove of the tubular member,
   an annular shoulder mounted on one side of the channel groove of the tubular member,
   an annular member reciprocally disposed around the channel groove of the tubular member, said annular shoulder and said annular member having correlative, oppositely disposed surfaces engaging said gasket upon sealing engagement,
   said gasket, annular shoulder, and annular member having an outer diameter smaller than the diameter of the bore and being received by the bore,
   an actuator member having an outer diameter greater than the diameter of the bore prior to the tubular member being received by the bore and having means engageable with the bore wall for compressing the actuator member to a smaller diameter than the bore when the tubular member is inserted into the bore,
   actuation means for applying an axial force on said actuator member when undergoing said compression causing said actuator member to engage said annular member compressing said gasket between said annular shoulder and annular member and move the inner and outer edges of said gasket into metal-to-metal sealing engagement with the tubular member and the internal wall of the bore, respectively.

2. The seal assembly of claim 1 wherein said correlative, oppositely disposed surfaces are frustoconical, said frustoconical surfaces and gasket are obdurate, and said gasket, annular shoulder, annular member, and actuator member are removable from the tubular member.

3. The seal assembly of claim 1 wherein said actuation means includes means for activating said actuation means from a location remote to the seal assembly.

4. A sealing system for use with a christmas tree resting on a wellhead, comprising:
   a tubing hanger having at least one bore therethrough, said tubing hanger being supported by a casing hanger disposed within the wellhead;
   at least one pack-off nipple depending from said tree, said pack-off nipple telescopically received in said bore, said pack-off nipple and said bore having substantially parallel walls;
   metal-to-metal sealing means attached to said pack-off nipple, and
   actuation means for actuating said metal-to-metal sealing means between said pack-off nipple wall and said bore wall after said pack-off nipple and said metal-to-metal sealing means are telescopically received in said bore, said metal-to-metal sealing means forming metal-to-metal seals between said pack-off nipple wall and said bore wall with said tree resting on the wellhead.

5. The assembly of claim 4 wherein said metal-to-metal sealing means includes a seal mechanism, and wherein said actuation means actuates said seal mechanism at a fixed location around said pack-off nipple.

6. The sealing system of claim 4 wherein said bore and pack-off nipple include substantially parallel, telescopically engaged walls and said metal-to-metal sealing means sealingly engages said walls.

7. The seal assembly of claim 4 wherein said actuation means includes means for activating said actuation means from a location remote to the seal assembly.

* * * * *